Feb. 2, 1932.  LE ROY COPELIN  1,843,868
BALANCE BEARING FOR CLOCKS AND THE LIKE
Filed Sept. 27, 1928

INVENTOR.
LeRoy Copelin
BY
ATTORNEY.

Patented Feb. 2, 1932

1,843,868

UNITED STATES PATENT OFFICE

LE ROY COPELIN, OF JACKSONVILLE, FLORIDA

BALANCE BEARING FOR CLOCKS AND THE LIKE

Application filed September 27, 1928. Serial No. 308,831.

My invention relates to improvements in balance bearings for clocks and the like, and particularly to a shock-absorbing or shockproof bearing for use with clocks, balance shafts and other structures embodying conical balance or shaft pivots.

An object of this invention is to provide a bearing structure which can be used as the original equipment in the manufacture of new clocks and the like, and which can also be applied as a repair or replacement part in substitution for other types of bearings.

A further object is to so construct the bearing that the needle-like point at the end of the balance or shaft is supported in a manner to permit limited endwise and lateral movement, such movement being resiliently cushioned and opposed to thus protect the bearing point from injury due to shocks and the like.

Another object is to provide a bearing structure which will be responsive to even slight shocks and with which the parts will automatically return to the normally centering position.

Still another object is to provide a structure which is fully adjustable to give the proper setting for the pivot bearing and is adjustable to accommodate the structure to carrying cushion effects.

With the above and other objects in view, it will be apparent to those skilled in the art that my invention includes certain novel features of construction and combinations of parts which will be hereinafter set forth in connection with the drawings.

Figure 1:
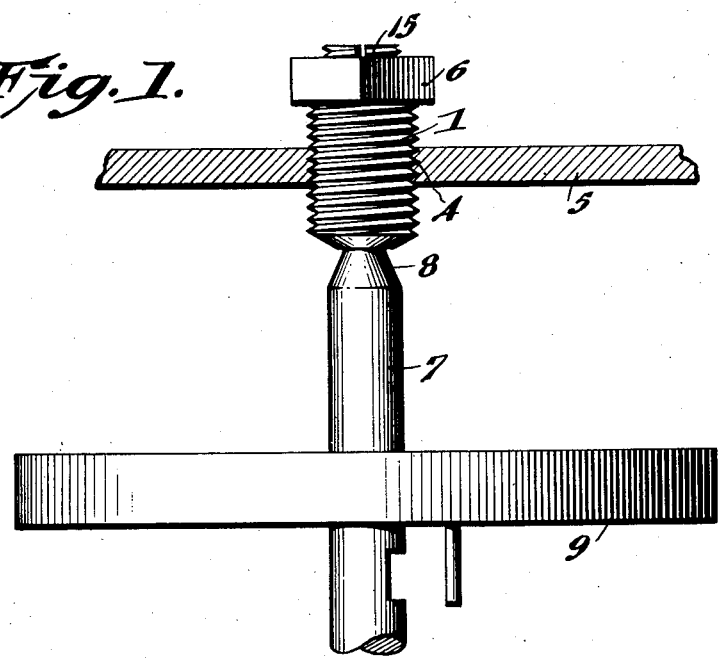
Figure 1 is a fragmentary view illustrating my invention embodied in a clock mechanism.

A screw or sleeve serving as a bearing support 1 is provided with a central bore 2 adapted to receive the bearing block or plunger 3, which is mounted therein for rocking or reciprocatory movement. In the present instance, I have shown the screw 1 as fitted through the threaded opening 4 in a clock movement plate 5, and a polygonal head 6 is provided on the screw to permit adjustment of same. The balance shaft 7 is provided with the usual conical bearing end 8, and has a balance wheel 9 mounted in its medial portion.

At one end of the sleeve 2 a centering flange or shoulder 10 is provided which also serves to limit endwise movement of the bearing block 3 within the bore 2. The centering flange or shoulder 10, which is shaped to be of conical tapered form on its inner face, has the central opening 11 thereof provided with a wall corresponding substantially to the taper of the conical pivot end 8 of the balance or shaft, and the bearing block 3 has a bearing socket 12 therein of conical shape formed on a somewhat wider angle than the angle of the apex of the conical bearing end 8. The bearing socket 12 is made of such depth that when the end of bearing block 3 abuts against the inner side of flange or shoulder 10, the pivot end 8 will be held out to have clearance from the wall 11.

The bearing block or plunger 3 has a rounded bead-like shoulder 13 around the end away from socket 12 of an outside diameter to slide freely within the bore 2, and the remaining portion of this block or plunger is reduced in diameter to permit lateral rocking movement of the end having the bearing socket or recess 12 therein, the bead or shoulder 13 serving substantially as a rocker bearing under such circumstances. This bearing block or plunger may be made of steel, brass, porcelain, jewel-bearing material, or can be constructed of any material or any combination of materials to give the desired bearing surface or socket for the conical bearing end 8.

The remaining end of bore 2 is provided with internal screw threads at 14, and a screw plug 15 is adjustably fitted in this threaded end. A light coil spring 16 is placed within the bore 2 to bear against the head end of bearing block or plunger 3 and is confined by the screw plug 15, this screw plug 15 being adjustable to vary the bearing strength of the spring 16.

Figure 2:
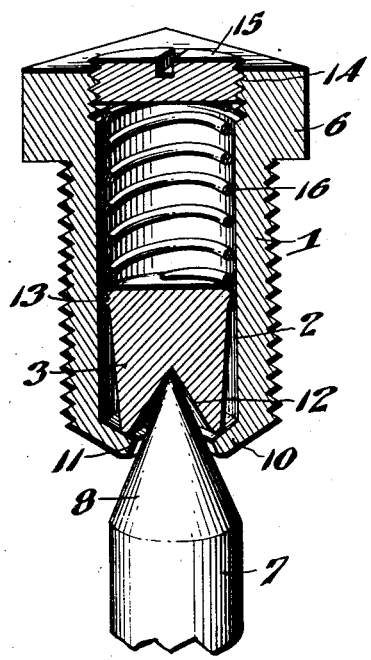
Fig. 2 is an enlarged vertical view to better show the bearing structure.

In use my improved bearing structure can be fitted in place as original or replacement equipment after the manner shown in Fig. 1, and the screw sleeve 1 will be adjusted so that the wall 11 clears the pivot point and provides clearance on all sides. The pivot point 8 is then received within the bearing socket 12, and the screw plug 15 is adjusted to give the desired resilient bearing pressure against the bearing plug or plunger 3. Further adjustments can be made at any time by manipulating the screw plug 15 or the entire structure. My improved bearing structure can be mounted at either or both ends of a balance or shaft, and can be embodied substantially in any connection where a conical pivot bearing end is to be mounted.

Where my bearing structure is fitted in place and the mechanism is subjected to dropping or shocks causing the pivot point 8 to be forced against the bearing in line with the axis of shaft 7, the spring 16 permits plug 3 to move into the bore 2, and the pivot end 8 comes into contact with the wall 11, thus taking the main strain of the shock upon an enlarged portion of the pivot end and completely protecting the needle-like point. Where shocks or the like cause movement of the shaft or balance 7 in a direction angular to the axis thereof, the reduced end of the block 3 will rock within the bore 2, and the thick body portion of the pivot end 8 will engage the wall 11 to stop the movement. As the socket 12 is formed on a wide angle, the needle-like end of pivot point 8 will remain properly centered. In either instance, and in fact when any displacement of the bearing block has occurred through shocks or otherwise, the spring 16 will exert resilient force upon the block 3 to press this block against the conically tapered shoulder 10 to restore the same to the centered normal position, as illustrated in Fig. 2, immediately after the disturbing shock or influence is passed.

From the foregoing it will be seen that I have provided a bearing structure for use in connection with substantially any and all conical pivot bearing shafts and the like, which is of such construction that the parts will be normally held and centered in a position for most efficient operation, and that provision is made for cushioned movement to prevent damage to the needle-like bearing point and for stoppage of such movement by contact with spring portions of the structure, and that the arrangement and construction is such that the parts will be automatically returned to normal centered position.

While I have herein shown and described only certain specific embodiments of my invention and have suggested only certain possible modifications, it will be appreciated that changes and variations can be made in the form, construction, arrangement and mounting of the parts to suit varying conditions of use without departing from the spirit and scope of my invention.

I claim:

1. In combination with a shaft having a conical pivot end, a bearing block, means by which said bearing block is mounted to allow rocking movement at one end laterally with respect to the axis of said shaft, said bearing block being provided with a bearing socket opening of substantially conical shape in the rockable end, and means to hold said block with the bearing socket opening normally in a predetermined centering and to return said block to the normal position when shocks of displacement are removed.

2. A bearing for mounting conical bearing points comprising a bearing member having a central bore terminating in a conically tapered flange at one end and provided with a central opening through said flange, a bearing block mounted within the bore capable of reciprocatory movement and having a portion thereof reduced to allow rocking movement within the bore, said bearing block having a substantially conical bearing recess on the reduced end, and resilient means normally urging said bearing block to a position with the reduced end centered within said conically tapered flange.

3. A bearing for mounting conical bearing points comprising a bearing member having a central bore, a bearing block mounted within the bore for rocking and reciprocatory movement and provided at one end with a substantially conical bearing recess, a flange around one end of said bearing member of conically tapered form on its inner side to partly close the central bore of said bearing member, and provided with an opening of sufficient size to receive and normally clear the bearing point, said flange through the walls of the opening thereof serving as an abutment to limit reciprocating and rocking movement of the bearing point, and resilient means normally urging said bearing block to center within said conically tapered flange.

4. A bearing for conical bearing pivots, comprising a bearing member having a bore therein, a bearing block mounted for reciprocatory movement within the bore and provided with a conical bearing recess in its outer end, said block being made of reduced diameter around said end to allow rocking lateral movement within the bore of the bearing member, a flange of conically tapered form at the end of the bore of the bearing member adjacent said bearing block forming an abutment to stop and center the bearing block and provided with an opening of less diameter than the maximum diameter of the bearing point but of sufficient size to provide clearance for the bearing point when the same is received in the bearing recess with the bearing block centered within the conical tapered flange, and a spring within the bore acting against said bearing block to press said block resiliently into contact with the tapered flange to center the rockable end thereof.

In testimony whereof I hereunto affix my signature.

LE ROY COPELIN.